(12) United States Patent
Eronen et al.

(10) Patent No.: US 9,659,595 B2
(45) Date of Patent: May 23, 2017

(54) VIDEO REMIXING SYSTEM (75) Inventors: Antti Johannes Eronen, Tampere (FI); Juha Henrik Arrasvuori, Tampere (FI); Arto Juhani Lehtiniemi, Lempaala (FI)

(73) Assignee: Nokia Technologies Oy, Espoo (FI)

( * ) Notice: Subject to any disclaimer, the term of this patent is extended or adjusted under 35 U.S.C. 154(b) by 152 days.

(21) Appl. No.: 14/402,445

(22) PCT Filed: May 31, 2012

(86) PCT No.: PCT/FI2012/050540
§ 371 (c)(1),
(2), (4) Date: Nov. 20, 2014

(87) PCT Pub. No.: WO2013/178868
PCT Pub. Date: Dec. 5, 2013

(65) Prior Publication Data
US 2015/0147049 A1    May 28, 2015

(51) Int. Cl.
| | |
|---|---|
| *H04N 5/262* | (2006.01) |
| *G11B 27/031* | (2006.01) |
| *G11B 27/28* | (2006.01) |
| *G06K 9/62* | (2006.01) |
| *H04N 21/233* | (2011.01) |

(Continued)

(52) U.S. Cl.
CPC ........ *G11B 27/031* (2013.01); *G06K 9/00275* (2013.01); *G06K 9/6293* (2013.01); *G11B 27/28* (2013.01); *H04N 5/265* (2013.01); *H04N 5/2628* (2013.01); *H04N 21/233* (2013.01); *H04N 21/23418* (2013.01); *H04N 21/234363* (2013.01); *H04N 21/2665* (2013.01); *H04N 21/41407* (2013.01); *H04N 21/4223* (2013.01); *H04N 21/854* (2013.01); *G06K 9/00288* (2013.01)

(58) Field of Classification Search
CPC .......... G06K 9/00275; G06K 9/00221; G06K 9/00268; G06K 9/00288; G11B 27/031; H04N 21/23418; H04N 5/262; H04N 5/2628; H04N 5/265; H04N 21/21805; H04N 21/4223
USPC ....................................... 386/285
See application file for complete search history.

(56) References Cited

U.S. PATENT DOCUMENTS

| | | |
|---|---|---|
| 2004/0078188 A1 | 4/2004 | Gibbon et al. |
| 2008/0209484 A1 | 8/2008 | Xu |

(Continued)

OTHER PUBLICATIONS

International Search Report and Written Opinion received for corresponding Patent Cooperation Treaty Application No. PCT/FI2012/050540, dated May 15, 2013, 16 pages.

(Continued)

*Primary Examiner* — David Harvey
(74) *Attorney, Agent, or Firm* — Alston & Bird LLP (57) ABSTRACT

A method and related apparatus for providing content information for a video remix, the method comprising: identifying at least one performer of an event on the basis of image data of a source video; obtaining information about a role of the at least one performer in the event; determining at least some video frames of the source video to contain said at least one performer as a dominant performer in said event; and annotating said video frames of the source video with a description of the role of the at least one performer.

20 Claims, 4 Drawing Sheets

(51) Int. Cl.
  *H04N 21/234* (2011.01)
  *H04N 21/2343* (2011.01)
  *H04N 21/2665* (2011.01)
  *H04N 21/414* (2011.01)
  *H04N 21/4223* (2011.01)
  *H04N 21/854* (2011.01)
  *H04N 5/265* (2006.01)
  *G06K 9/00* (2006.01)

(56) References Cited

U.S. PATENT DOCUMENTS

| | | | |
|---|---|---|---|
| 2009/0043725 A1 | 2/2009 | Gutta | |
| 2009/0087161 A1* | 4/2009 | Roberts | G11B 27/031 386/282 |
| 2009/0094375 A1* | 4/2009 | Lection | G06F 15/16 709/231 |
| 2009/0113022 A1* | 4/2009 | Quoc | G06Q 10/10 709/218 |
| 2009/0153654 A1* | 6/2009 | Enge | G06K 9/00624 348/61 |
| 2009/0169065 A1* | 7/2009 | Wang | G06F 17/30781 382/118 |
| 2010/0088726 A1 | 4/2010 | Curtis et al. | |
| 2010/0131571 A1 | 5/2010 | Reuveni | |
| 2010/0189408 A1* | 7/2010 | Itoh | H04N 5/222 386/278 |
| 2012/0014567 A1 | 1/2012 | Allegra et al. | |
| 2012/0039539 A1 | 2/2012 | Boiman et al. | |
| 2012/0077522 A1* | 3/2012 | Mate | H04N 21/2187 455/456.3 |
| 2013/0176438 A1* | 7/2013 | Mate | H04N 7/181 348/157 |
| 2014/0133837 A1* | 5/2014 | Mate | G11B 27/031 386/278 |

OTHER PUBLICATIONS

Cricri, F. et al., *Multimodal Event Detection in User Generated Videos*, IEEE International Symposium on Multimedia, (2011) 263-270.

Cricri, F. et al., *Sensor-Based Analysis of User Generated Video for Multi-Camera Video Remixing*, 18th International Conference on Multimedia Modeling (MMM 2012), 255-265.

Fuhrmann, F et al., *Quantifying the relevance of locally extracted information for musical instrument recognition from entire pieces of music*, In proceedings of the 12th International Society for Music Information Retrieval Conference (ISMIR 2011), available at http://ismir2011.ismir.net/papers/PS2-12.pdf, 239-244.

Lee, Jae-Ho, *Automatic Video Management System Using Face Recognition and Mpeg-7 Visual Descriptors*, ETRI Journal, vol. 27, No. 6 (Dec. 2005) 806-809.

Mauch, M. et al., *Timbre and Melody Featuers for the Recognition of Vocal Activity and Instrumental Solos in Polyphonic Music*, In proceedings of the 12h International Society for Music Information Retrieval Conference (ISMIR 2011), available at http://ismir2011.ismir.net/papers/PS2-11.pdf, 233-238.

Schwarze, T. et al., *Role-based Identity Recognition for Telecasts*, AIEMPro'10, (Oct. 2010) 27-32.

Verstockt, S. et al., *Actor Recognition for Interactive Querying and Automatic Annotation in Digital Video*, Proceeding of the 13th IASTED International Conference Internet and Multimedia Systems and Applications (2009) 149-155.

Yao, B. et al., *Grouplet: A Structured Image Representation for Recognizing Human and Object Interactions*, IEEE Computer Vision and Pattern Recognition (CVPR), 2010, available at http://vision.stanford.edu/pdf/YaoFei-Fei__CVPR2010a.pdf, 8 pages.

* cited by examiner

VIDEO REMIXING SYSTEM

RELATED APPLICATION

This application was originally filed as Patent Cooperation Treaty Application No. PCT/FI2012/050540 filed May 31, 2012.

BACKGROUND

Multimedia capturing capabilities have become common features in portable devices. Thus, many people tend to record or capture an event, such as a music concert or a sport event, they are attending. During many occasions, there are multiple attendants capturing content from an event, whereby variations in capturing location, view, equipment, etc. result in a plurality of captured versions of the event with a high amount of variety in both the quality and the content of the captured media.

Video remixing is an application where multiple video recordings are combined in order to obtain a video mix that contains some segments selected from the plurality of video recordings. Video remixing, as such, is one of the basic manual video editing applications, for which various software products and services are already available. Furthermore, there exist automatic video remixing or editing systems, which use multiple instances of user-generated or professional recordings to automatically generate a remix that combines content from the available source content. Some automatic video remixing systems depend only on the recorded content, while others are capable of utilizing environmental context data that is recorded together with the video content. The context data may be, for example, sensor data received from a compass, an accelerometer, or a gyroscope, or global positioning system (GPS) location data.

In the existing automatic video remixing services, a remix presentation from an event, such as a music concert or a theatre play, is primarily based on the audio tracks of the source videos. Additionally, camera sensor data may be used for excluding out-of-focus or shaking video shots, and through straightforward video content analysis dark shots may be excluded and locations of interest may be determined based on information on simultaneous panning and pointing to the same region by several users.

However, in order to make clever cuts between source videos, more detailed information on what happens in the video should be obtained. For example, in a music concert to be able to cut to the singer during the chorus, the singer should be somehow identified. During the guitar solo, it would be desirable to focus on the guitarist.

SUMMARY

Now there has been invented an improved method and technical equipment implementing the method for alleviating the above problems. Various aspects of the invention include methods, apparatuses, a system and computer programs, which are characterized by what is stated in the independent claims. Various embodiments of the invention are disclosed in the dependent claims.

The aspects of the invention are based on the idea of obtaining information about the roles of the performers and highlighting the person who is the most prominent performer at the moment, when selecting the cuts for a video remix.

According to a first aspect, there is provided a method for providing content information for a video remix, the method comprising: identifying at least one performer of an event on the basis of image data of a source video; obtaining information about a role of the at least one performer in the event; determining at least some video frames of the source video to contain said at least one performer as a dominant performer in said event; and annotating said video frames of the source video with a description of the role of the at least one performer.

According to an embodiment, the method further comprises providing a video remix service with a rule for cutting source videos on the basis of the information about the role of the at least one performer such that performers that are currently the dominant performers in the event are shown dominantly in the video remix.

According to an embodiment, the method further comprises applying a face recognition algorithm to the image data of the source video; detecting faces from the video frames, extracting a set of facial features from the detected faces in the video frames; and comparing the facial features against a reference set of facial features extracted from known reference face images.

According to an embodiment, the method further comprises applying motion and object recognition algorithms to facilitate the identification of the performers.

According to an embodiment, the method further comprises processing an audio track of the source video with an audio analysis algorithm to extract sections with instrumental or vocals solo sections; and annotating the audio track with time stamps indicating at least one part of the audio track containing a solo section.

According to an embodiment, the method further comprises providing an output of the audio analysis algorithm and the image analysis algorithms to a combining module for combining information on the video and audio analysis results.

According to an embodiment, the method further comprises obtaining the rule for cutting source videos on the basis of the information about the role of the at least one performer; and creating a video remix, wherein the annotated audio track controls the selection of the video frames of the source video containing said at least one performer as a dominant performer to be included in the video remix.

According to an embodiment, the method further comprises including a cropped video frame in the video remix, wherein an area of a video frame is cropped and re-scaled to a larger size to provide a magnification of the cropped area.

According to an embodiment, the method further comprises superimposing a cropped frame obtained from a first camera source containing the artist performing a solo on top of an image obtained from a second camera source showing a wide shot of the event.

According to an embodiment, the event is a music concert, and the method further comprises recognizing a title of a song performed in the concert; and limiting a search for the information about a role of the at least one performer in the event to artist performing said song.

According to a second aspect, there is provided an apparatus comprising at least one processor, memory including computer program code, the memory and the computer program code configured to, with the at least one processor, cause the apparatus to at least: identify at least one performer of an event on the basis of image data of a source video; obtain information about a role of the at least one performer in the event; determine at least some video frames of the source video to contain said at least one performer as a dominant performer in said event; and annotate said video frames of the source video with a description of the role of the at least one performer.

According to a third aspect, there is provided a computer program embodied on a non-transitory computer readable medium, the computer program comprising instructions causing, when executed on at least one processor, at least one apparatus to: identify at least one performer of an event on the basis of image data of a source video; obtain information about a role of the at least one performer in the event; determine at least some video frames of the source video to contain said at least one performer as a dominant performer in said event; and annotate said video frames of the source video with a description of the role of the at least one performer.

According to a fourth aspect, there is provided a system comprising at least one processor, memory including computer program code, the memory and the computer program code configured to, with the at least one processor, cause the system to at least: identify at least one performer of an event on the basis of image data of a source video; obtain information about a role of the at least one performer in the event; determine at least some video frames of the source video to contain said at least one performer as a dominant performer in said event; and annotate said video frames of the source video with a description of the role of the at least one performer.

According to a fifth aspect, there is provided an apparatus comprising: means for identifying at least one performer of an event on the basis of image data of a source video; means for obtaining information about a role of the at least one performer in the event; means for determining at least some video frames of the source video to contain said at least one performer as a dominant performer in said event; and means for annotating said video frames of the source video with a description of the role of the at least one performer.

These and other aspects of the invention and the embodiments related thereto will become apparent in view of the detailed disclosure of the embodiments further below.

LIST OF DRAWINGS

In the following, various embodiments of the invention will be described in more detail with reference to the appended drawings, in which.

DESCRIPTION OF EMBODIMENTS

As is generally known, many contemporary portable devices, such as mobile phones, cameras, tablets, are provided with high quality cameras, which enable to capture high quality video files and still images. In addition to the above capabilities, such handheld electronic devices are nowadays equipped with multiple sensors that can assist different applications and services in contextualizing how the devices are used. Sensor (context) data and streams of such data can be recorded together with the video or image or other modality of recording (e.g. speech).

Usually, at events attended by a lot of people, such as live concerts, sport games, political gatherings, and other social events, there are many who record still images and videos using their portable devices, thus creating user generated content (UGC). A significant amount of this UGC will be uploaded to social media portals (SMP), such as Facebook, YouTube, Flickr®, and Picasa™, etc. These SMPs have become de facto storages of the generated social media content. The uploaded UGC recordings of the attendants from such events, possibly together with various sensor information, provide a suitable framework for the present invention and its embodiments.

The following describes in further detail suitable apparatuses and possible mechanisms for an enhanced multimedia content remix service. In this regard reference is first made to FIG. 1 which shows a schematic block diagram of an exemplary apparatus or electronic device 50, which may incorporate necessary functions for displaying preview content on the display of the user's apparatus and selecting the content for the remix according to an embodiment of the invention.

Figure 1:
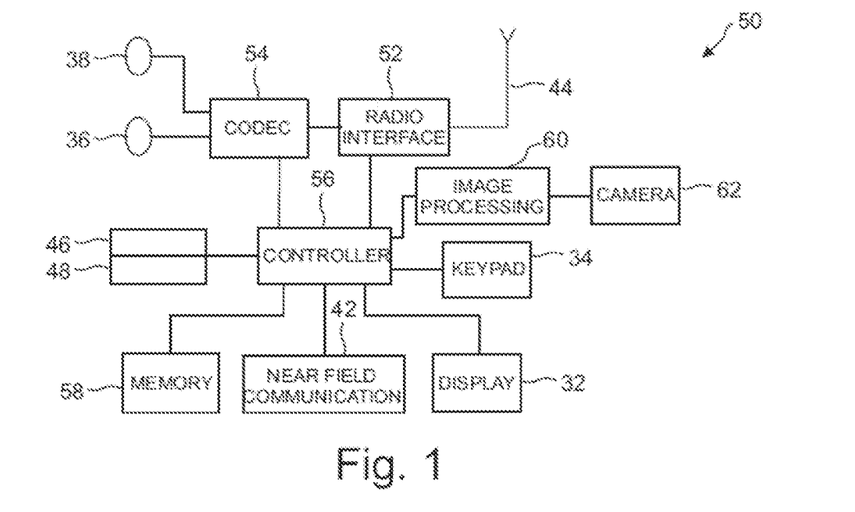
FIG. 1 shows a schematic block diagram of an exemplary apparatus suitable to be used in a video remixing service according to an embodiment.

The electronic device 50 may be, for example, a mobile terminal or user equipment of a wireless communication system, a digital camera, a laptop computer etc. However, it would be appreciated that embodiments of the invention may be implemented within any electronic device or apparatus which may contain multimedia processing properties.

The apparatus 50 may comprise a housing 30 (FIG. 2) for incorporating and protecting the device. The apparatus 50 further may comprise a display 32 in the form of a liquid crystal display. In other embodiments of the invention the display may be any suitable display technology suitable to display an image or video. In some embodiments the display 32 may be a touch-sensitive display meaning that, in addition to be able to display information, the display 32 is also able to sense touches on the display 32 and deliver information regarding the touch, e.g. the location of the touch, the force of the touch etc. to the controller 56. Hence, the touch-sensitive display can also be used as means for inputting information. In an example embodiment the touch-sensitive display 32 may be implemented as a display element and a touch-sensitive element located above the display element.

Figure 2:
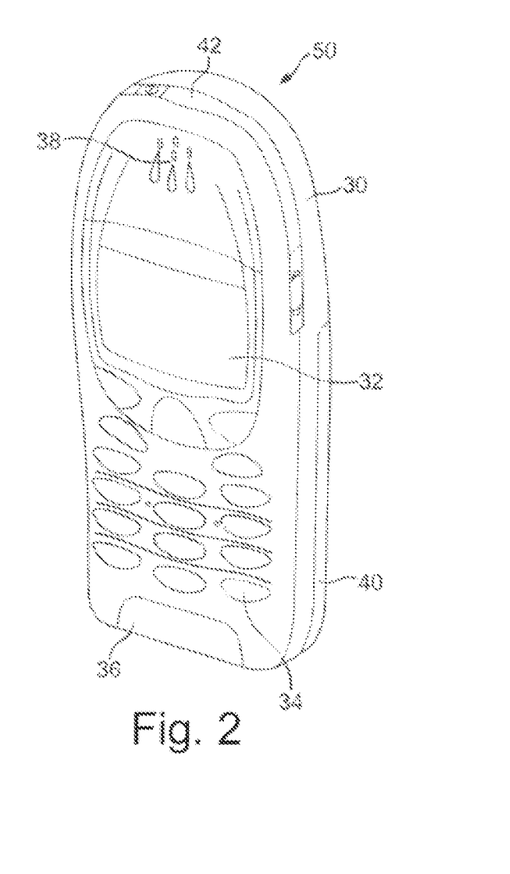
FIG. 2 shows another view of the exemplary apparatus of FIG. 1.

The apparatus 50 may further comprise a keypad 34. In other embodiments of the invention any suitable data or user interface mechanism may be employed. For example, the user interface may be implemented as a virtual keyboard or data entry system as part of a touch-sensitive display or it may contain speech recognition capabilities. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise a near field communication (NFC) connection 42 for short range communication to other devices, e.g. for distances from a few centimeters to few meters or to tens of meters. In other embodiments the apparatus 50 may further comprise any suitable short range communication solution such as for example a Bluetooth wireless connection, an infrared port, a universal serial bus (USB) or a Firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to a codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system and/or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments, the apparatus 50 may comprise a camera 62 capable of recording or detecting individual frames or images which are then passed to an image processing circuitry 60 or controller 56 for processing. In further embodiments, the apparatus may receive the image data from another device prior to transmission and/or storage. In further embodiments, the apparatus 50 may receive either wirelessly or by a wired connection the image for coding/decoding.

In some embodiments, the apparatus 50 may also comprise a GPS system for providing the location data of the apparatus, a compass for providing the orientation of the apparatus, an accelerometer and/or a gyroscope for providing information about the movements of the apparatus. The context data provided by these sensors can be used in the automatic video editing.

Figure 3:
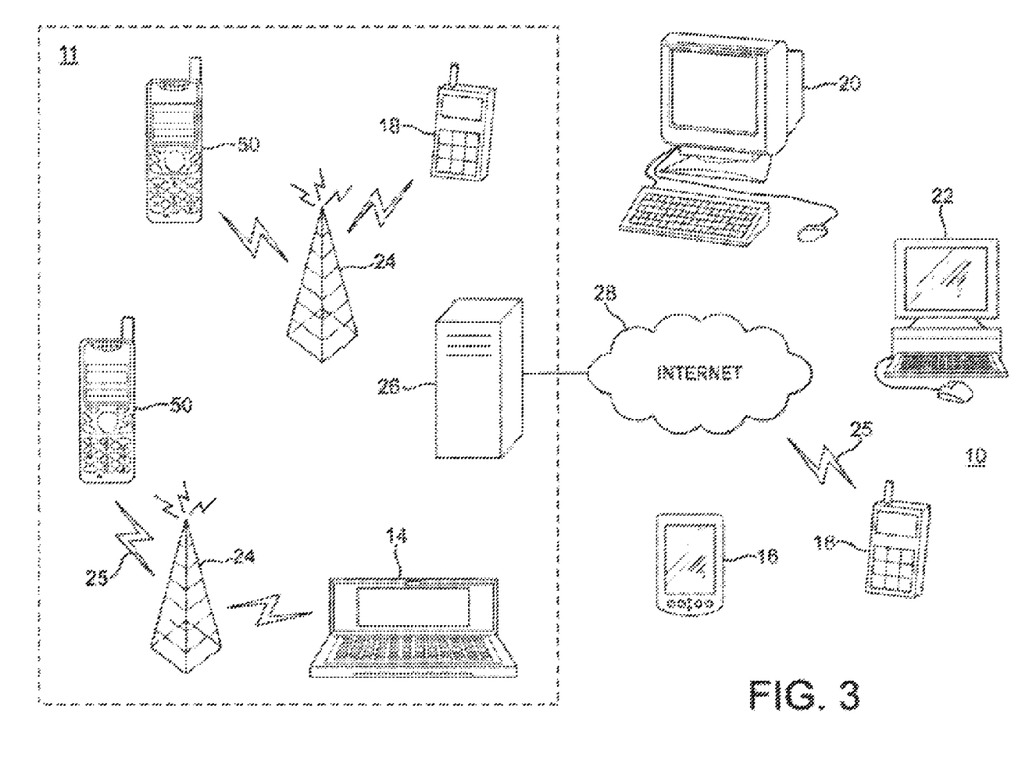
FIG. 3 shows an example of a suitable apparatus to be used in a video remixing service according to an embodiment.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as the global system for mobile communications (GSM) network, 3rd generation (3G) network, 3.5th generation (3.5G) network, 4th generation (4G) network, universal mobile telecommunications system (UMTS), code division multiple access (CDMA) network etc), a wireless local area network (WLAN) such as defined by any of the Institute of Electrical and Electronic Engineers (IEEE) 802.x standards, a Bluetooth personal area network, an Ethernet local area network, a token ring local area network, a wide area network, and the Internet.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a computer operating as a network server 22. The apparatus 50 may be stationary or mobile when carried by an individual who is moving. The apparatus 50 may also be located in any mode of transport, such as a vehicle.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

One or more of the computers disclosed in FIG. 3 may be configured to operate a multimedia content remix service, which can be referred to as a media mixer service (MMS). The MMS is a service infrastructure that is capable of receiving user communication requests for inviting other users. The MMS, together with the computer(s) running the service, further comprise networking capability to receive and process media content and corresponding context data from other data processing devices, such as servers operating social media portals (SMP). Herein, the term social media portal (SMP) refers to any commonly available portal that is used for storing and sharing user generated content (UGC). The UGC content may be stored in a unified format that holds the contextual data together with media data, such as MPEG file format with context data storage extensions. Some examples of popular SMPs are YouTube, Flickr®, and Picasa™. It is apparent for a skilled person that the media mixer service MMS and the social media portals SMP are implemented as network domains, wherein the operation may be distributed among a plurality of servers.

A video remix, which has been created according to the preferences of a user, is sometimes referred to as a Director's Cut (DC). The source content refers to all types of media that is captured by users, wherein the source content may involve any associated context data. For example, videos, images, audio captured by users may be provided with context data, such as information from various sensors, such as from a compass, an accelerometer, a gyroscope, or information indicating location, altitude, temperature, illumination, pressure, etc. A particular sub-type of source content is a source video, which refers to videos captured by the user, possibly provided with the above-mentioned context information.

Any user can request from the video remix service an automatically created Director's Cut version from the material available for the service. The service creates an automatic cut of the video clips of the users. The service may analyze the sensory data to determine which are interesting points at each point in time during the event, and then makes switches between different source media in the final cut. Audio alignment is used to find a common timeline for all the source videos, and, for example, dedicated sensor data (accelerometer, compass) analysis algorithms are used to detect when several users are pointing to the same location on the stage, most likely indicating an interesting event. Furthermore, music content analysis (beats, downbeats), is used to find a temporal grid of potential cut points in the event sound track.

Figure 4:
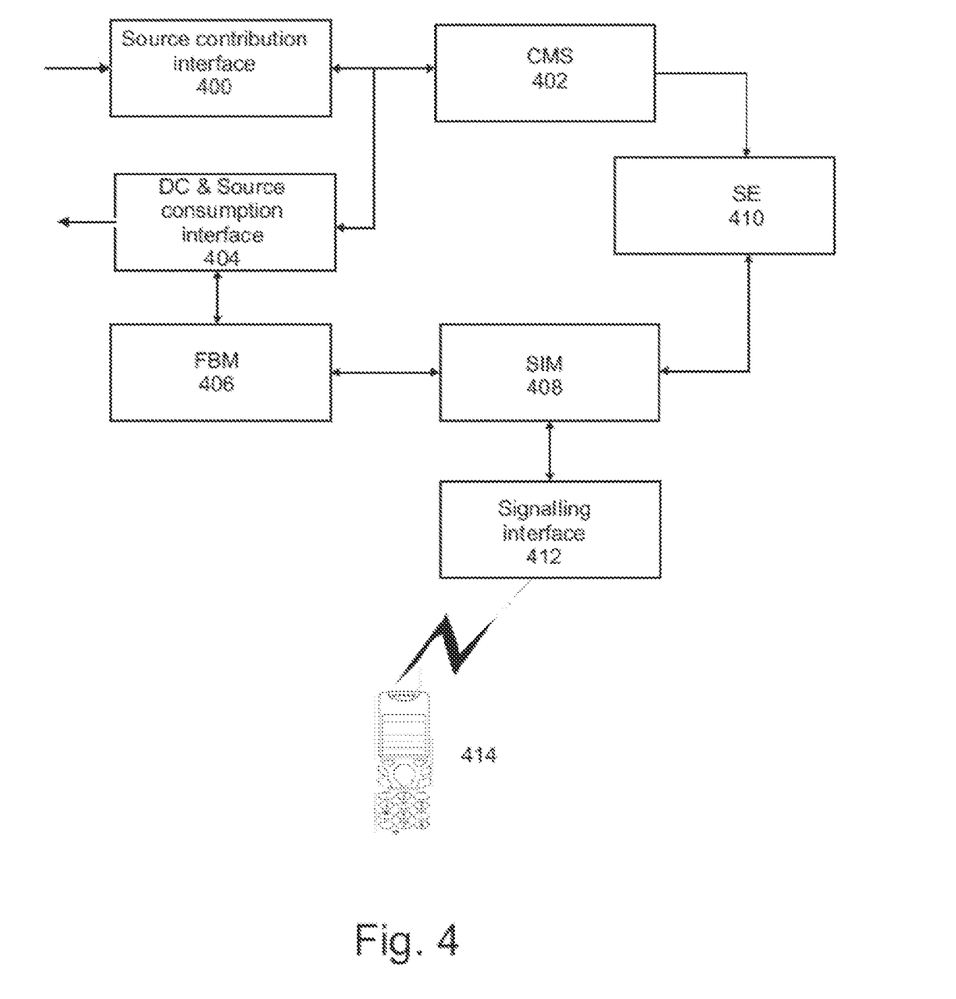
FIG. 4 shows an exemplified service architecture for creating a Director's Cut (DC)

The present embodiments relate to providing an automatic video remix service with enhanced information on the content of the source videos, and therefore the actual structure of the automatic video remix service is not relevant for the embodiments. However, for illustrative purposes, FIG. 4 shows exemplified service architecture for creating a Director's Cut (DC). The service architecture may include components, known as such from contemporary video editing services, for example an interface 400 for the users contributing their recorded content from the event, which interface may annotate the contributed content for clustering the content related to the same event for generating the DC, a content management system (CMS; 402) to store/tag/organize the content, and an interface 404 for delivering the DC and its related source content for the users to consume.

The service architecture of FIG. 4 may further comprise a feedback module (FBM; 406) to capture the content consumption feedback about the content contributed by the users and the DC versions that have been generated. The feedback information may be provided to a synergistic intelligence module (SIM; 408), which contains the required intelligence or the logic required to analyze and create the information about the user contributed source content that is contributed to the service. The SIM is connected to a user apparatus 414 via a signalling interface 412, which enables the user to request a DC to be created according to user-defined parameters and also to provide new UGC content to be used in the DC generation process.

In the analysis the SIM may utilize, in addition to the feedback information, also information about the arrival distribution pattern of the source content. The SIM may use the UGC contribution data from past events in various locations and use it to generate a probabilistic model to predict user content contribution's arrival time (or upload time) to the service. The information provided by the SIM are received in a synergizing engine (SE; 410), which may be implemented as a separate module that interacts with the CMS, the SIM and the FBM to generate the DC versions that match the criteria signalled by the user requesting a DC. The information provided by the SIM enables the SE to utilize the previous DC versions and their consumption feedback as inputs, in addition to the newly provided source content and its consumption feedback, wherein the SE changes the weights of different parameters which are used to combine the multitude of content.

For providing an automatic video remix service with enhanced information on the content of the source videos, there is provided a method comprising identifying at least one performer of an event on the basis of image data of a source video, obtaining information about a role of the at least one performer in the event, determining at least some video frames of the source video to contain said at least one performer as a dominant performer in said event, and annotating said video frames of the source video with a description of the role of the at least one performer.

According to an embodiment, the video remix service may be provided with a rule for cutting source videos on the basis of the information about the role of the at least one performer such that performers that are currently the dominant performers in the event are shown dominantly in the video remix.

Figure 5:
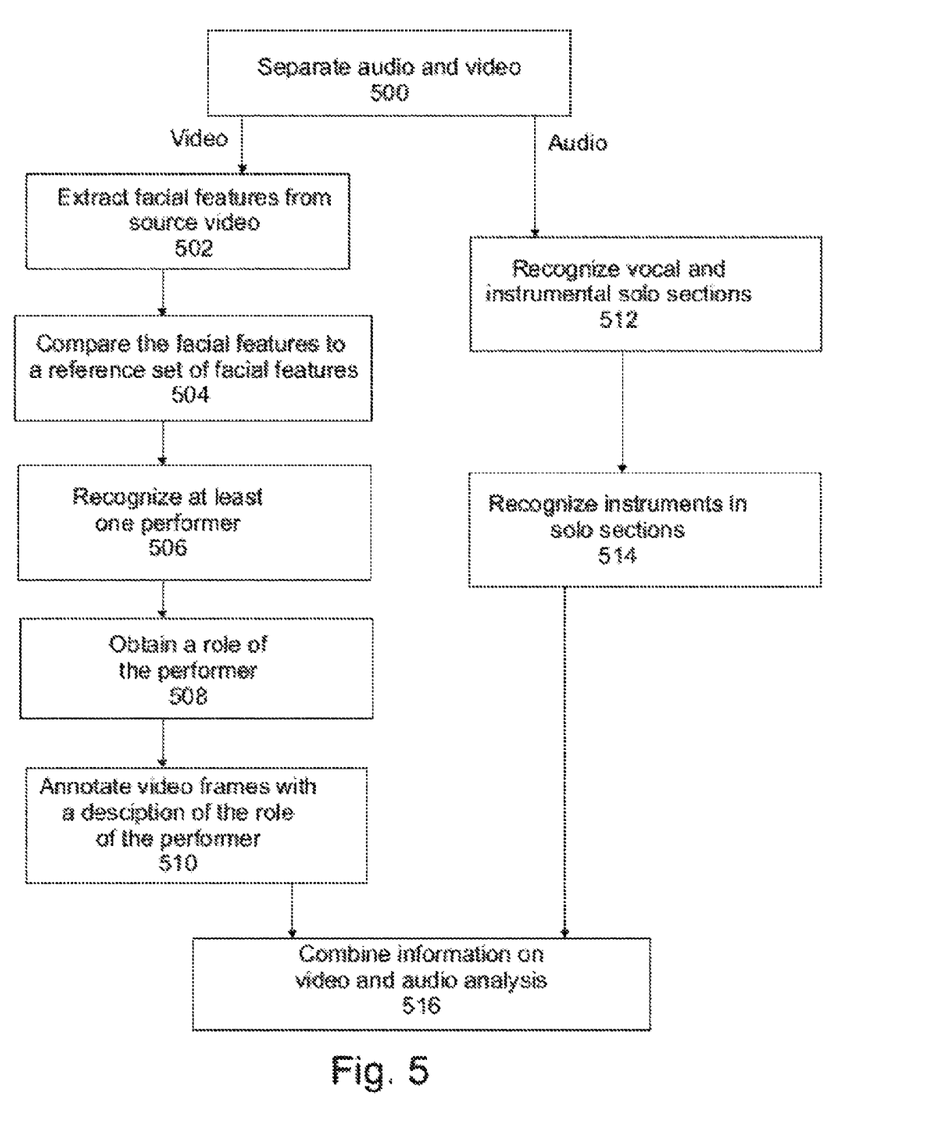
FIG. 5 shows a method for providing enhanced content information for a video remix according to an embodiment.

FIG. 5 shows a simplified operation flow, wherein some embodiments are applied to provide an automatic video remix service with enhanced information on the content of the source videos relating to a music concert. It is apparent for a skilled person that the same principles are applicable to any other social events, such as sports events, family events such as weddings, political gatherings, cultural events, and the like.

The following steps may be performed as pre-processing steps for the video remix service, which are carried out for each incoming source video clip. When inputting a source video clip into the video remix service, the video data and the audio track may be separated or demultiplexed (500) for separate analysis.

For identifying at least one performer of the concert on the basis of the image data of the source video, a face recognition algorithm may be applied to the image data of the source video, wherein faces are detected from at least some of the video frames, and a set of facial features are extracted (502) from the detected faces in the video frames. The facial features are compared (504) against a reference set of facial features extracted from known reference face images, in this example preferably face images of musicians.

The reference face images may be obtained from any source. An image database could be used as a source of the reference face images, or an online service available via a data network could be used as well. Examples of such online services are sources available via Internet, such as Wikipedia, discogs.com, All Music Guide, or any service which provides information on music and musicians.

As a result of the comparison, at least one performer of the concert is identified (506). In addition to face recognition, various motion and object recognition algorithms may be used to facilitate the identification of the performers. For example, motion and object recognition can be used to determine what instrument is being played by each performer. For example, visual object recognition may be used to detect an instrument of a distinguishable shape or colour, such as a flute or a saxophone. Moreover, the performer's motions for playing e.g. drums are distinctive from playing other instruments, and this may be detected using a motion recognition algorithm. Furthermore, images of instruments belonging to certain musicians may be used together with facial images to facilitate recognition of a performer. Examples include using pictures of unique, signature style guitars along with pictures of the guitarist owner to recognize guitarists.

Next, the roles of the identified performers are obtained (508) from a data source. Herein, the data sources may be the same, where the reference face images were obtained: an image database comprising the necessary data about roles, or online services available via Internet, such as Wikipedia or discogs.com.

The role of a performer in a band may be, for example, a singer, a guitarist, a bassist, a pianist, a backup singer, etc. In addition to recognizing the permanent band members, also visiting artists may be recognized and their roles identified, if their images are included in the source used, such as Wikipedia. In a similar manner, the common roles for the visiting artist may be obtained (singer, instrumentalist, and so on). A special tag may be included in the description indicating that this is a visiting star, not a permanent member of the band.

Furthermore, the roles may also be "The Star", "Supporting Musician", or "Stage Crew". When creating rules for cutting source videos on the basis of the information about the role of the performers, the rule may state that "The Star" is shown in most of the selected camera angles and that showing "Stage Crew" is to be avoided in the selected angles.

Thus, at least some video frames of the source video are determined to contain at least one performer as a currently dominant performer in the concert, and the corresponding video frames of the source video are annotated (510) with a description of the role of the at least one performer.

It is noted that the obtaining of the artist images and the artist roles in the band may be carried out as a separate background process, wherein the content is searched and obtained e.g. periodically from an online source.

In different types of events, various alternative mechanisms could be used for obtaining information on the roles of performers or event participants. In various sports events, such as ice hockey or football or the like, online sources such as home pages of sports teams or leagues may be consulted to obtain the roles of athletes, such as goal keeper, forward, defender, coach. Family trees or social networks could be used for obtaining the roles or social relationships of people for weddings or the like. Roles could include, for example, mother, father, bride, groom, and the like. Online sources could also be used for obtaining roles for actors in a theatre play or opera.

According to an embodiment, in addition to analysing the image data of the source video, also the audio track of the source video may be processed with audio analysis algorithms to extract sections with instrumental solos and vocals (512). Additionally, the instruments of the instrumental sections may be identified (514). In addition to solo sections, the vocalists and instrumentalists may be recognized also in other music sections, such as intro, verse, chorus, bridge, and coda. A possible algorithm suitable for the process is described in: Matthias Mauch, Hiromasa Fujihara, Kazuyoshi Yoshii, Masataka Goto, "Timbre and melody features for the recognition of vocal activity and instrumental solos in polyphonic music", In proceedings of the 12h International Society for Music Information Retrieval Conference (ISMIR 2011), available at http://ismir2011.ismir.net/papers/PS2-11.pdf.

The output of the audio processing steps are time stamps and labels indicating whether the audio track comprises a solo section, and if yes, whether the solo section is presented by a single instrument (e.g. guitar), as a vocal solo section, or e.g. whether the whole band is playing.

After the video and audio content has been analysed, the output may be provided to a combining module which combines (516) information on the video and audio analysis results. For example, the image analysis results may indicate that a particular frame contains the singer with 80% probability and the guitarist with 20% probability. The audio analysis module may output that the corresponding audio section contains a sound of a guitar with 40% probability and singing with 60% probability. The combining module may combine these probabilities, e.g., using weighted summation, and arrive at final probabilities. For example, the final probabilities may be 0.5*(80%+60%)=70% for singer and 0.5*(20%+40%)=30% for guitar. As a result, the corresponding video frame(s) and audio section may be annotated with singer. In a corresponding manner, further video frames of the source video are determined to contain at least one performer as a currently dominant performer during the concert. After combination, the annotated video frame(s) and audio sections are stored in a database to be used when creating new Director's Cuts.

The annotation for a video frame may comprise the label of the recognized performer (such as the singer), a lead guitarist, or the like or the label and a probability value associated with the label. The annotation may also comprise several fields or labels, such as the name of the performer, his or her role in the band, and the instrument. Also several alternative labels or annotations with probabilities may be assigned to the frames in the case there are several possibilities of detected performers, for example, in the case of an uncertain recognition. Instead of probabilities, confidences or any numerical values indicating the certainty or probability associated with the detection of the performer might be used. Such probability values may later be utilized by automatic video cutting algorithms, which may utilize probabilistic measures to evaluate potential candidate video cuts, for example, in order to select one that maximizes a certain probabilistic target criterion.

In the following, various embodiments relating to creating new Director's Cuts on the basis of the annotated video frame(s) and audio sections are described. As a starting point for creating a new Director's Cut, a rule or a profile must be obtained, according to which source videos are included in the Director's Cut. The rules and/or profiles may have been defined by the developers or the maintenance personnel of the video remix service. Alternatively, each user, when ordering a Director's Cut version, may be able to define or modify the rules.

On the basis of the information about the roles of the performers in the source videos, at least two generic rules could be applied: "During a solo, prefer in choosing the angles the musician performing the solo" or "During a vocal solo, choose or crop only close-ups of the lead vocalist." These rules could be applied for example as follows: when an annotation in an audio track indicates that a guitar solo starts, video frames of a view containing the face of the person recognized as guitarist should be selected to be displayed simultaneously in the Director's Cut. Similarly, during a vocal solo, a cut should be made to a view containing the vocalist. In a duet between a saxophone and a vocalist, alternate cuts between views of these two performers could be applied. The time points of the cuts between the video angles may be based on the recognized beat of the music or the starting point of a distinct part of a song (e.g. verse, chorus, or coda).

In other words, the audio track determines what the event which should guide the view selection is. If the audio track indicates that currently there is singing, then the preferred video view is one of the views containing the singer.

In other types of events, different kinds of rules could be applied. For example, during a sports game, a rule may be that when the game is ongoing, it is preferred to show one of the active players on the field and during breaks the view could be on the coach or the most prominent cheerleader, for example. As another example, when a wedding ceremony is ongoing, it is preferable to view either the priest, the bride, or the groom most of the time. Other ceremony participants, such as the parents, may be shown only shorter time. Whenever there is a break, or before and/or after the ceremony, the view can contain more other people, such as parents or other relatives. In political events, the system may weigh the probability of including a person in a view with his rank in the political system. For example, if there are a president, a prime minister, and other members of a government present in the event, the president may be shown more time than the prime minister or other members of the government if the president is the highest ranking politician in the political system in question. The basic rule for cutting in this case may be that the person currently speaking or performing is shown for most of the time, but whenever several participants are active the relative duration of showing them may depend on their rank in the political system.

According to an embodiment, if a visiting artist is performing on some of the video views and the audio track indicates that it matches the instrument of the visiting artist (vocals, an instrument), then the view containing the visiting star may be prioritized over other views. This is because the visiting star is likely an important distinguishing factor for the performance and should be included in the cut video.

According to an embodiment, the use of the rules based on the performer's role may also be weighted, for example so that they are not used when choosing every cut angle but for example only for 25% of the cuts. Thus, in this case the selection criteria for the remaining 75% of the cuts would be established according to default Director's Cut criteria.

According to an embodiment, automatic cropping of a frame can be used instead of selecting a different camera angle when creating the Director's Cut. This enables to create a visual effect that highlights a performer's current importance or role in the song as detected through audio track analysis. For example, when the analysis of the audio track detects that a guitar solo starts in the song, the visual region determined to contain the guitarist can be cropped from the original frame resolution to a smaller resolution and then re-scaled to a larger size to provide a magnification of the cropped area. The cropped area could be re-scaled, for example, to the dimensions of the original frame. If the original source video is captured with a high definition quality, such as 1080p, and the original aspect ratio (e.g. 16:9) is applied to the cropped area, the resulting resolution is still in quality that is acceptable, such as 720p, for viewing on handheld devices.

According to an embodiment, various effects may be performed with the cropped area, such making it larger or smaller, or a cropped frame obtained from a first camera source containing the artist performing a solo may be superimposed on top of an image obtained from a second camera source showing a wide shot of the whole band. The superimposed cropped frame may also be animated.

According to yet another embodiment, the background image could be combined from multiple individual source videos. Static regions of the source videos, e.g. the stage, could be analysed and handled differently while combining the source videos, which may improve the rendering speed and the resulting visual quality of the combined image.

According to yet another embodiment, the video remix service may attempt to recognize the title of the song, which is currently being performed. Thereby, the search range for finding further information on artists is remarkably limited and the video and audio analysis can be carried out faster. The recognition can be done, for example, comparing the time of the performance to a list of song titles and their start times. The list could be obtained, for example, from the concert organizers, Director's Cut service administrators, or visitors of the concert.

The recognition may also be performed via means of audio fingerprinting, such as the Shazam® audio fingerprinter by Shazam Entertainment. These fingerprinters, typically applied on studio music, may not be optimal for live music but whenever the live performance is close enough to a recorded performance from an album or a previous concert, quite reliable recognition may be obtained. Further, the recognition could be carried out on the basis of video analysis. When using video analysis, a possibility is to recognize unique events which are specific to certain songs. For example, in some songs artists switch to specific instruments, and this may be used as a cue for identifying the song.

When the song has been identified, information on the song can be searched from various data sources, such as Wikipedia or other database to help in analyzing the video and audio tracks. For example, a list of artists and bands which have performed the song can be fetched. This can be used to limit the search range within which the face recognition needs to be performed. Another example is to search in an online database for the instruments which are commonly used to perform the song, and use the list of instruments to limit the search range within which instruments need to be performed.

According to another embodiment, means of speech recognition may be used to determine the roles performed by actors in theatre play-type of events. The system may access the scripts of theatre plays from an online database to determine which play is performed during the event.

A skilled man appreciates that any of the embodiments described above may be implemented as a combination with one or more of the other embodiments, unless there is explicitly or implicitly stated that certain embodiments are only alternatives to each other.

The various embodiments may provide advantages over state of the art. For example, the embodiments may be applied to provide aesthetically more pleasing personalized video remix versions of videos from all kinds of live performances, including music concerts, musicals, operas, and theatre plays. As the camera resolution of portable devices is increasing all the time, cropping video for highlighting a performer in it becomes a viable solution since even the cropped region can be displayed with a quite high resolution as well.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, or CD.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi core processor architecture, as non limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method for providing content information for a video remix, the method comprising:
   identifying at least one performer of an event on the basis of image data of a source video;
   obtaining information about a role of the at least one performer in the event;
   processing an audio track of the source video to extract sections with instrumental or vocals solo sections;
   determining at least some video frames of the source video to contain said at least one performer as a dominant performer in said event, the dominant performer being determined based upon a probability that the at least one performer appears in said video frames and the processed audio track; and
   annotating said video frames of the source video with a description of the role of the at least one performer.

2. The method of claim 1, the method further comprising providing a video remix service with a rule for cutting source videos on the basis of the information about the role of the at least one performer such that performers that are currently the dominant performers in the event are shown dominantly in the video remix.

3. The method of claim 1, the method further comprising applying a face recognition algorithm to the image data of the source video;
   detecting faces from the video frames,
   extracting a set of facial features from the detected faces in the video frames; and
   comparing the facial features against a reference set of facial features extracted from known reference face images.

4. The method of claim 3, the method further comprising applying motion and object recognition algorithms to facilitate the identification of the performers.

5. The method of claim 1, the method further comprising processing the audio track of the source video with an audio analysis algorithm to extract the sections with instrumental or vocals solo sections; and
   annotating the audio track with time stamps indicating at least one part of the audio track containing a solo section.

6. The method of claim 5, the method further comprising providing an output of the audio analysis algorithm and the image analysis algorithms to a combining module for combining information on the video and audio analysis results.

7. The method of claim 5, the method further comprising obtaining the rule for cutting source videos on the basis of the information about the role of the at least one performer; and
   creating a video remix, wherein the annotated audio track controls the selection of the video frames of the source video containing said at least one performer as a dominant performer to be included in the video remix.

8. The method of claim 7, the method further comprising including a cropped video frame in the video remix, wherein an area of a video frame is cropped and re-scaled to a larger size to provide a magnification of the cropped area.

9. The method of claim 7, wherein the event is a music concert, the method further comprising
   recognizing a title of a song performed in the concert; and
   limiting a search for the information about a role of the at least one performer in the event to artist performing said song.

10. An apparatus comprising at least one processor and at least one memory including computer program code, the at least one memory and the computer program code configured to, with the at least one processor, cause the apparatus to at least:
    identify at least one performer of an event on the basis of image data of a source video;
    obtain information about a role of the at least one performer in the event;
    process an audio track of the source video to extract sections with instrumental or vocals solo sections;
    determine at least some video frames of the source video to contain said at least one performer as a dominant performer in said event, the dominant performer being determined based upon a probability that the at least one performer appears in said video frames and the processed audio track; and
    annotate said video frames of the source video with a description of the role of the at least one performer.

11. The apparatus of claim 10, wherein the at least one memory and the computer program code are configured to, with the at least one processor, cause the apparatus to at least:
    provide a video remix service with a rule for cutting source videos on the basis of the information about the role of the at least one performer such that performers that are currently the dominant performers in the event are shown dominantly in the video remix.

12. The apparatus of claim 10, wherein the at least one memory and the computer program code are configured to, with the at least one processor, cause the apparatus to:
   apply a face recognition algorithm to the image data of the source video;
   detect faces from the video frames,
   extract a set of facial features from the detected faces in the video frames; and
   compare the facial features against a reference set of facial features extracted from known reference face images.

13. The apparatus of claim 12, wherein the at least one memory and the computer program code are configured to, with the at least one processor, cause the apparatus to:
   apply motion and object recognition algorithms to facilitate the identification of the performers.

14. The apparatus of claim 10, wherein the at least one memory and the computer program code are configured to, with the at least one processor, cause the apparatus to:
   process the audio track of the source video with an audio analysis algorithm to extract the sections with instrumental or vocals solo sections; and
   annotate the audio track with time stamps indicating at least one part of the audio track containing a solo section.

15. The apparatus of claim 14, wherein the at least one memory and the computer program code are configured to, with the at least one processor, cause the apparatus to:
   provide an output of the audio analysis algorithm and the image analysis algorithms to a combining module for combining information on the video and audio analysis results.

16. The apparatus of claim 14, wherein the at least one memory and the computer program code are configured to, with the at least one processor, cause the apparatus to:
   obtain the rule for cutting source videos on the basis of the information about the role of the at least one performer; and
   create a video remix, wherein the annotated audio track controls the selection of the video frames of the source video containing said at least one performer as a dominant performer to be included in the video remix.

17. The apparatus of claim 16, wherein the at least one memory and the computer program code are configured to, with the at least one processor, cause the apparatus to:
   include a cropped video frame in the video remix, wherein an area of a video frame is cropped and re-scaled to a larger size to provide a magnification of the cropped area.

18. The apparatus of claim 17, wherein the at least one memory and the computer program code are configured to, with the at least one processor, cause the apparatus to:
   superimpose a cropped frame obtained from a first camera source containing the artist performing a solo on top of an image obtained from a second camera source showing a wide shot of the event.

19. The apparatus of claim 16, the apparatus wherein the at least one memory and the computer program code are configured to, with the at least one processor, cause the apparatus to
   recognize, in response to the event being a music concert, a title of a song performed in the concert; and
   limit a search for the information about a role of the at least one performer in the event to artist performing said song.

20. A computer program product comprising a non-transitory computer readable storage medium, the non-transitory computer readable storage medium comprising instructions that when executed by at least one processor, configure the processor to:
   identify at least one performer of an event on the basis of image data of a source video;
   obtain information about a role of the at least one performer in the event;
   process an audio track of the source video to extract sections with instrumental or vocals solo sections;
   determine at least some video frames of the source video to contain said at least one performer as a dominant performer in said event, the dominant performer being determined based upon a probability that the at least one performer appears in said video frames and the processed audio track; and
   annotate said video frames of the source video with a description of the role of the at least one performer.

* * * * *